US011250133B2

United States Patent
Chan et al.

(10) Patent No.: US 11,250,133 B2
(45) Date of Patent: Feb. 15, 2022

(54) CONFIGURABLE CODE SIGNING SYSTEM AND METHOD

(71) Applicant: ARRIS Enterprises LLC, Suwanee, GA (US)

(72) Inventors: Tat Keung Chan, San Diego, CA (US);
Ting Yao, San Diego, CA (US);
Alexander Medvinsky, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 602 days.

(21) Appl. No.: 16/246,870

(22) Filed: Jan. 14, 2019

(65) Prior Publication Data
US 2021/0397677 A1    Dec. 23, 2021

Related U.S. Application Data

(60) Provisional application No. 62/616,497, filed on Jan. 12, 2018.

(51) Int. Cl.
*G06F 21/57* (2013.01)
*H04L 9/32* (2006.01)
*G06F 21/64* (2013.01)
*H04L 9/14* (2006.01)

(52) U.S. Cl.
CPC .............. *G06F 21/57* (2013.01); *G06F 21/64* (2013.01); *H04L 9/14* (2013.01); *H04L 9/3247* (2013.01)

(58) Field of Classification Search
CPC ....... G06F 21/57; G06F 21/64; H04L 9/3247; H04L 9/14
See application file for complete search history.

(56) References Cited

U.S. PATENT DOCUMENTS

| | | | |
|---|---|---|---|
| 2004/0162989 A1* | 8/2004 | Kirovski | G06F 21/64 713/189 |
| 2016/0365983 A1 | 12/2016 | Shahabuddin et al. | |
| 2017/0161375 A1* | 6/2017 | Stoica | G06F 16/353 |
| 2017/0257380 A1 | 9/2017 | Yao et al. | |
| 2017/0329821 A1* | 11/2017 | Agrawal | G06F 16/245 |
| 2019/0034664 A1* | 1/2019 | Barnes | G06F 21/52 |
| 2020/0112427 A1* | 4/2020 | Nakamura | H04L 9/3239 |
| 2020/0314073 A1* | 10/2020 | Troia | H04L 9/3239 |

FOREIGN PATENT DOCUMENTS

WO    WO 2014/026095 A2  *   2/2014   ............... H04L 9/30

OTHER PUBLICATIONS

U.S. Appl. No. 16/213,106, filed Dec. 7, 2018.

* cited by examiner

*Primary Examiner* — Christopher A Revak
(74) *Attorney, Agent, or Firm* — Chernoff, Vilhauer, McClung & Stenzel, LLP

(57) ABSTRACT

A system is provided for configurably signing a secure data image that includes software code that interprets cryptographic atomic code. In the system, a code signing engine includes an interpreter that interprets atomic code signing operations presented in a recipe defined by a system administrator according to configuration parameter values supplied with the input image.

20 Claims, 8 Drawing Sheets

CONFIGURABLE CODE SIGNING SYSTEM AND METHOD

CROSS REFERENCE TO RELATED APPLICATIONS

This application claims benefit of U.S. Provisional Patent Application No. 62/616,497, entitled "CONFIGURABLE CODE SIGNING SYSTEM," by Tat Keung Chan, Ting Yao, Alexander Medvinsky, filed Jan. 12, 2018, which application is hereby incorporated by reference herein.

BACKGROUND

1. Field

The present disclosure relates to systems and methods for cryptographically signing data, and in particular to a system and method for configurably signing software code and data.

2. Description of the Related Art

Systems for signing software code are known in the art. For example, U.S. Patent Publication 2017/0257380, incorporated by reference herein, discloses a system that permits user and entity access to perform code signing operation on one or more of a plurality of devices. Such online code signing systems permit users to submit software code for signing by a managing entity by use of a code signing engine with built-in code signing operations known as operation types such as PKCS #1, PKCS #7, or any other standard or proprietary crypto operation.

However, such code signing systems are not very flexible in their support of new operation types. This is because operation types are implemented as built-in operations of the code signing engine. New operation types require code changes in code signing engine, and such changes must typically be made as a part of a full software release cycle for quality assurance purposes. This delays implementation of new features. Further, there are issues of code duplication in this approach, that is the same snippet of code may be duplicated over similar operation types.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for generating a signed input image in a configurable code signing system. In one embodiment, the method comprises defining a recipe associated with a recipe identifier, accepting, in the configurable code signing system, a request to sign the input image, the request comprising the input image, having the (a) plurality of data fields and software code and input image values of the configuration parameters disposed within the plurality of data fields and (b) an identifier of a signing configuration, the signing configuration that includes the recipe identifier and approved configuration parameter values. The method further comprises reading the recipe identified by the recipe identifier, parsing and interpreting the sequence of atomic operations of the recipe, generating the output image having the signed input image at least in part by executing the parsed and interpreted sequence of atomic operations of the recipe using the input image values of the configuration parameters, and providing the output image. In one embodiment, the recipe is defined by defining an operation type associated with the recipe, the operation type defined from one or more input image signing requirements, defining a plurality of data fields of the input image, specifying a list of configuration parameters and associating each of the specified configuration parameters with at least one of the plurality of the data fields, and specifying a sequence of atomic operations operating on input image values of the configuration parameters to generate an output image having the signed input image. The sequence of atomic operations includes a byte atomic operation referencing at least one of the plurality of data fields and an offset within the one of the plurality of data fields wherein the byte atomic operation retrieves data of the input image at the offset and a signing atomic operation for signing the input image at least in part according to the input image values of the configuration parameters. Another embodiment is evidenced by a processor having a communicatively coupled memory storing processor instructions for performing the foregoing operations.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Online Code Signing System

Disclosed below is an online code signing system (OCSS) that supports standard code signing formats such as PKCS #1, PKCS #7 and other proprietary signing mechanisms. The OCSS also performs operations such as code encryption and decryption.

The OCSS offers a web portal for users to login and sign code images or other types of digital objects, generate digital signatures, encrypt code, and/or decrypt code. The OCSS utilizes an architecture which consists of a client application, an OCSS frontend (front-end server), and an OCSS backend (back-end server).

Code Signing System Elements

Figure 1:
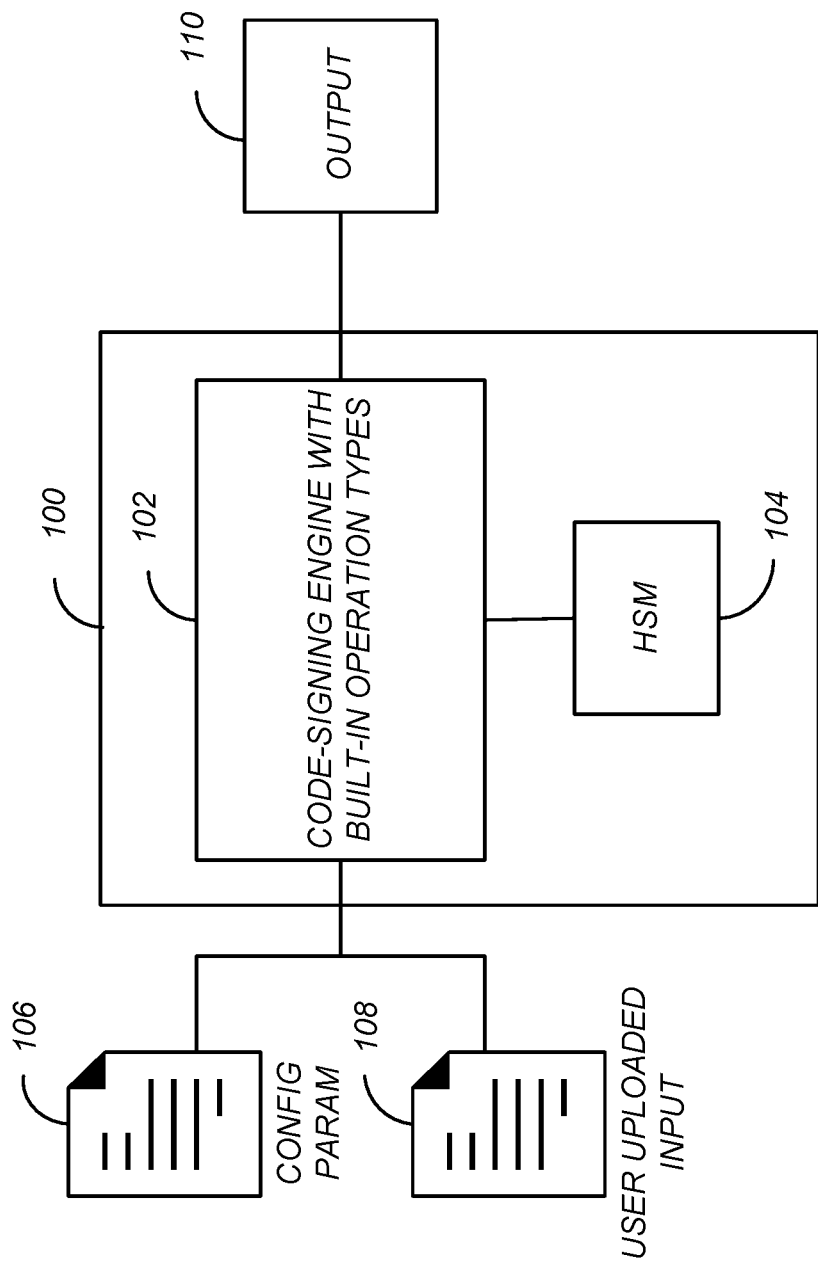
FIG. 1 is a diagram of elements of a general purpose code signing system.

FIG. 1 is a diagram of elements of a standard code signing system 100. The code signing system 100 comprises a code signing engine 102. In one embodiment, the code signing engine 102 has built in code signing operations implemented as "operation types." Operation types may include for example, PKCS #1, PKCS #7, or any other standard or proprietary crypto operations. The code signing system 100 may also include an HSM 104. Any cryptographic keys for signing and encryption are preferably protected in the HSM 104 accessible by the Code Signing Engine 102 via an API.

Before a client can use the code signing system 100, a "configuration" is defined (typically by a system administrator). The configuration includes parameters 106 that define the operation type, the key, and include any standard parameters defined by the operation type. For example, the PKCS #1 operation type may require am RSA signing key, and standard parameters may include the Endianess of the operation and what hashing algorithm to use (for example, SHA1 or SHA256).

Once the configuration is defined and authorized to a client, the client can sign code by submitting a request with a pointer to the configuration and the input code image to the system. The code signing engine 102 executes the code implemented for that operation type over the configuration parameters and input image in the request, to create the final output image to return to the client.

There are different ways to organize signing configurations. One such way is to use a hierarchy structure such as the one illustrated and described with respect to FIGS. 2 and 3 below.

Figure 2:
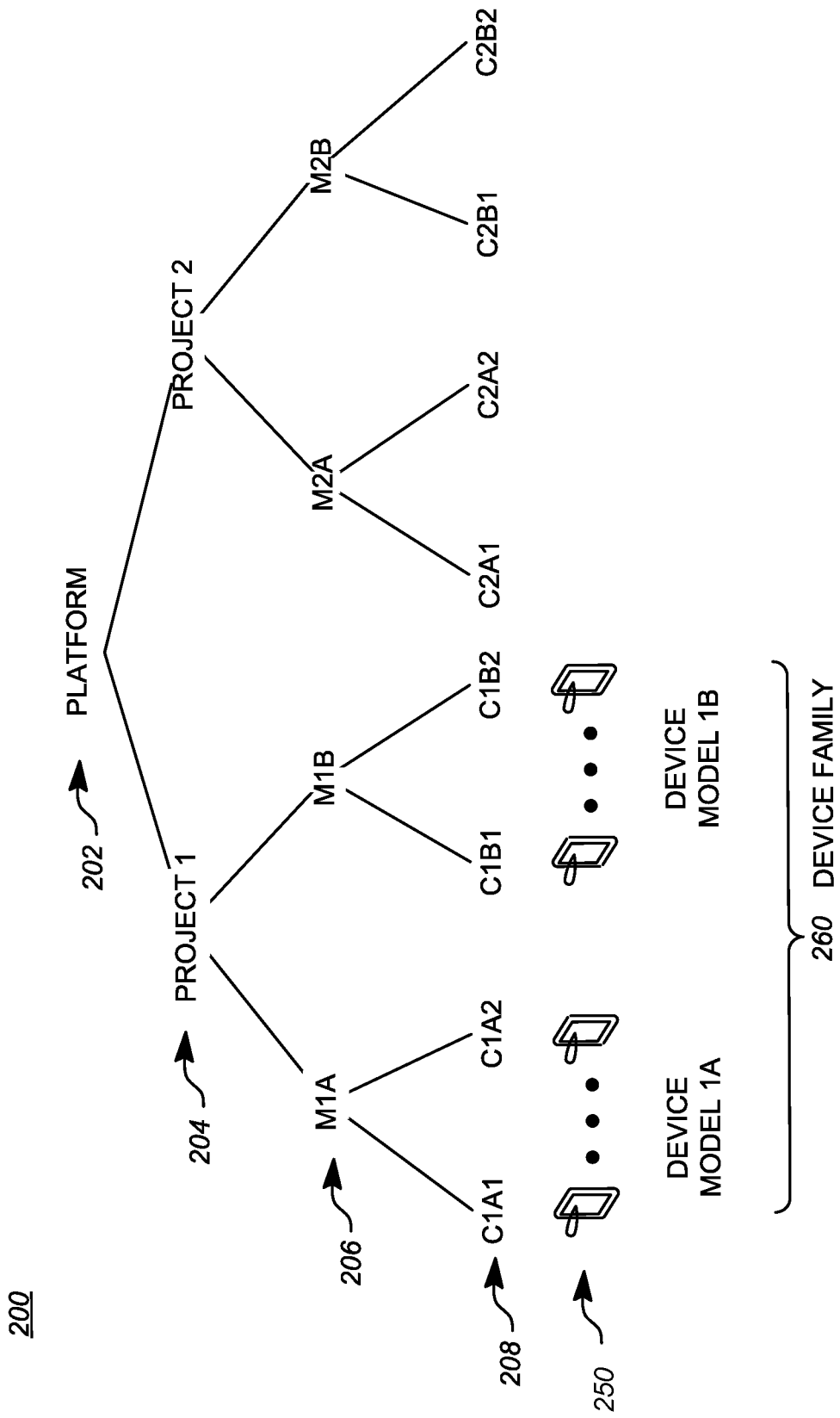
FIG. 2 is a diagram depicting a hierarchical organization of a plurality of entities associated with data signing operations.

FIG. 2 is a diagram depicting a hierarchical organization (e.g. hierarchy 200) of a plurality of entities associated with data signing operations discussed above. The hierarchy 200 of entities includes, in decreasing hierarchical order, an application platform entity 202, at least one project entity 204 for each application platform entity 202, at least one model entity 206 for each project entity 204 and at least one configuration entity 208 for each model entity.

The application platform entity 202 may be evidenced by a corporate entity that produces a plurality of devices 250, for example, the assignee of this application, ARRIS, INC. A platform entity 202 is defined as a highest hierarchical entity that organizes the code signing metadata/information for the fielded devices 250.

The project entity 204 typically comprises a family of devices 260 produced by the application platform entity 202. For example, the corporate entity ARRIS may produce a first family of devices 260 such as set top boxes (STBs) for receiving satellite broadcasts (one project entity) and another family of devices 260 such as STBs for receiving cable broadcasts. Familial or group bounds can be defined as desired, but are typically defined to include products with analogous or similar functional requirements or functional architectures. For example, the project entity may be defined according to the functionality or source of the chip used in the devices 250—for example, those that use one particular digital telecommunication processing chip family belonging to one project 204 and another digital telecommunication processing chip family in another project entity.

The model entity 206 can represent the particular models of the devices 250, for example models of satellite STBs and cable STBs. In the context of data signing, the model designation defines the how the signed data is to be installed on the devices 250 associated with the model entity 206. For example, a particular model of satellite STB may use a different technique for installing new data or code than a different model of the satellite STB. In the context of signing, the configuration entity defines the data to be installed on the devices 250.

For example, the satellite STB of the aforementioned example may include bootloader code (code that executes upon a system reboot that uploads and executes code and scripts), as well as application code. One configuration entity may represent bootloader code, while a different configuration entity represents the application code.

Figure 3:
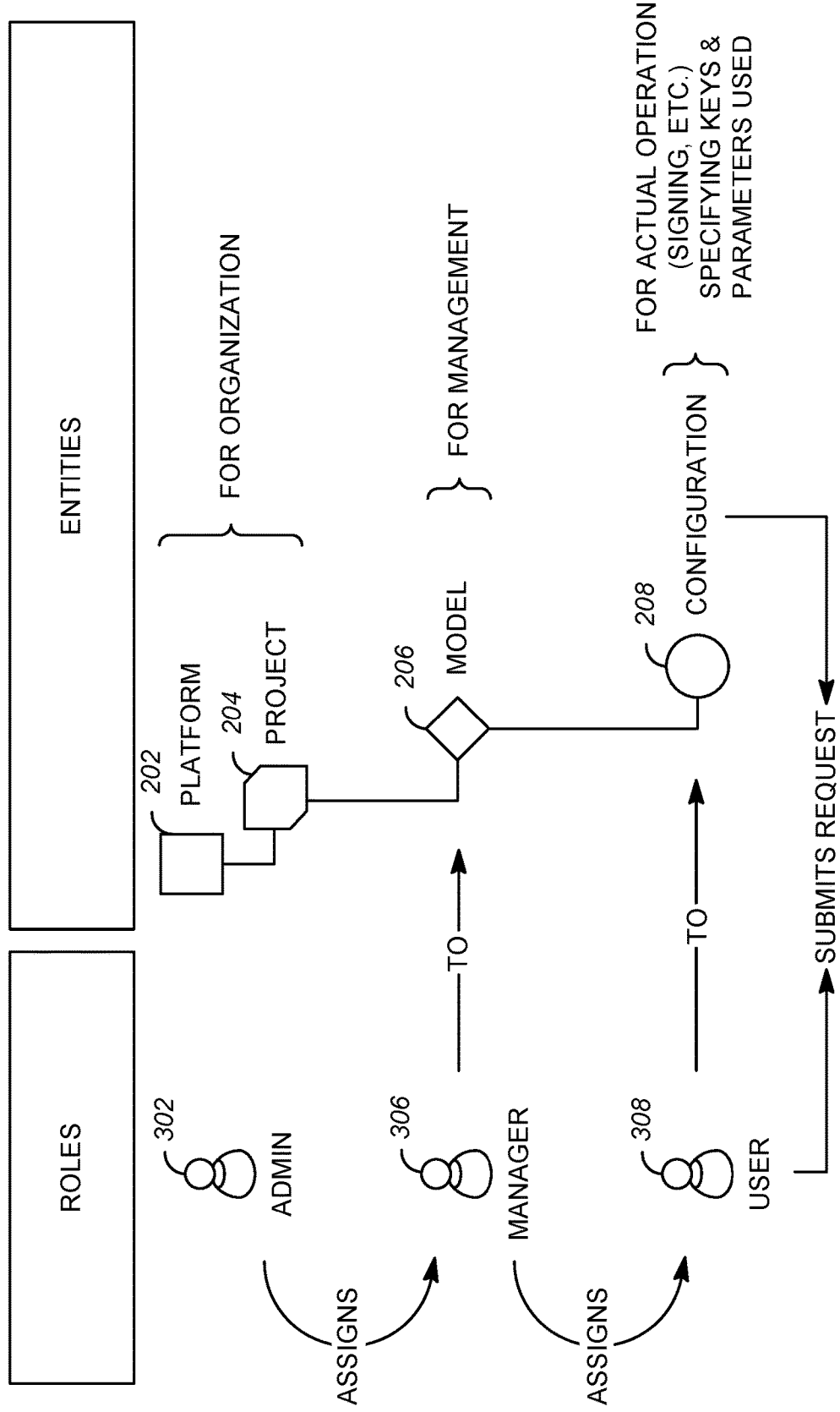
FIG. 3 is a diagram depicting the hierarchical organization and the roles associated with those entities.

FIG. 3 is a diagram depicting the hierarchical organization 200 and the roles associated with those entities. An administrator 302 of the code signing system 100 is identified, and that administrator 302 is authorized to define the hierarchy of the entities in decreasing order, an application platform entity 202, at least one project entity 204 for each application platform entity 202, at least one model entity 206 for each project entity 204, and at least one configuration entity 208 for each model entity 206. The administrator 302 is also authorized to access and authorize access to any of the entities 202-208 and may also assign a manager role 306 to another individual to manage a particular model entity 206. This individual (hereinafter alternatively referred to as the manager 306 of the model entity 206) is thus a person having the manager role 306 with respect to the associated model entity 206. This manager 306 is authorized to designate or assign user roles 308 to particular individuals for a particular configuration entity 208. This individual (herein alternatively referred to as a user 308 of a particular configuration entity 208) is thus a person having a user role 308 with respect to an associated configuration entity 208. Importantly, managers 306 may not add users (this can be accomplished only by the OCSS administrator), but authorize users to perform certain roles.

The configuration entity 208 holds information regarding the specific code signing operation such as signing keys, signature algorithm, file format, and other security parameters. Managers 306 are normally defined to have access to this configuration information for all the configurations under the manager's managed entity (model 206). Users who has access to a configuration entity 208 can use it to perform the code signing activity according to the specified information/parameter but normally don't see the detailed information (e.g. keys, algorithms and the like) itself.

The configurations are organized in a hierarchy structure starting from Platform 202, followed by project 204, model 206 and then the actual configurations 208. Users of the code signing system may be assigned different roles. In this example, the Administrator 302 is responsible for defining the various entities in the system and assigning users 308 as manager 306 to models 206. The managers 306 are responsible for assigning users 308 (machine clients in this case) to the actual signing configurations. And finally, user 308 can submit signing requests to authorized configurations to perform signing operations.

In the code signing system of FIG. 1, each operation type is implemented as built-in operations in the code signing engine 102. This limits the flexibility of the code signing system 100 to support new operation types, because any new operation type will require code change in code signing engine 102. For quality control, this change must be part of a full software release cycle, even if the new operation type is very similar to an existing operation type, which significantly slows the development and release of the software for any such new features. For instance, an existing operation type may require signing the entire file while a new operation type may require validating certain portion of the input data before signing the entire file. While the addition to the existing operation type is small and relatively simple, this small change requires a code change in the code signing engine 102 and this change would necessitate another pass through the release cycle, delaying introduction of the new operation type. Also, there are issues of code duplication in this approach. For example, the same snippet of code may be duplicated over similar operation types.

Overview of Configurable Code Signing System

Figure 4:
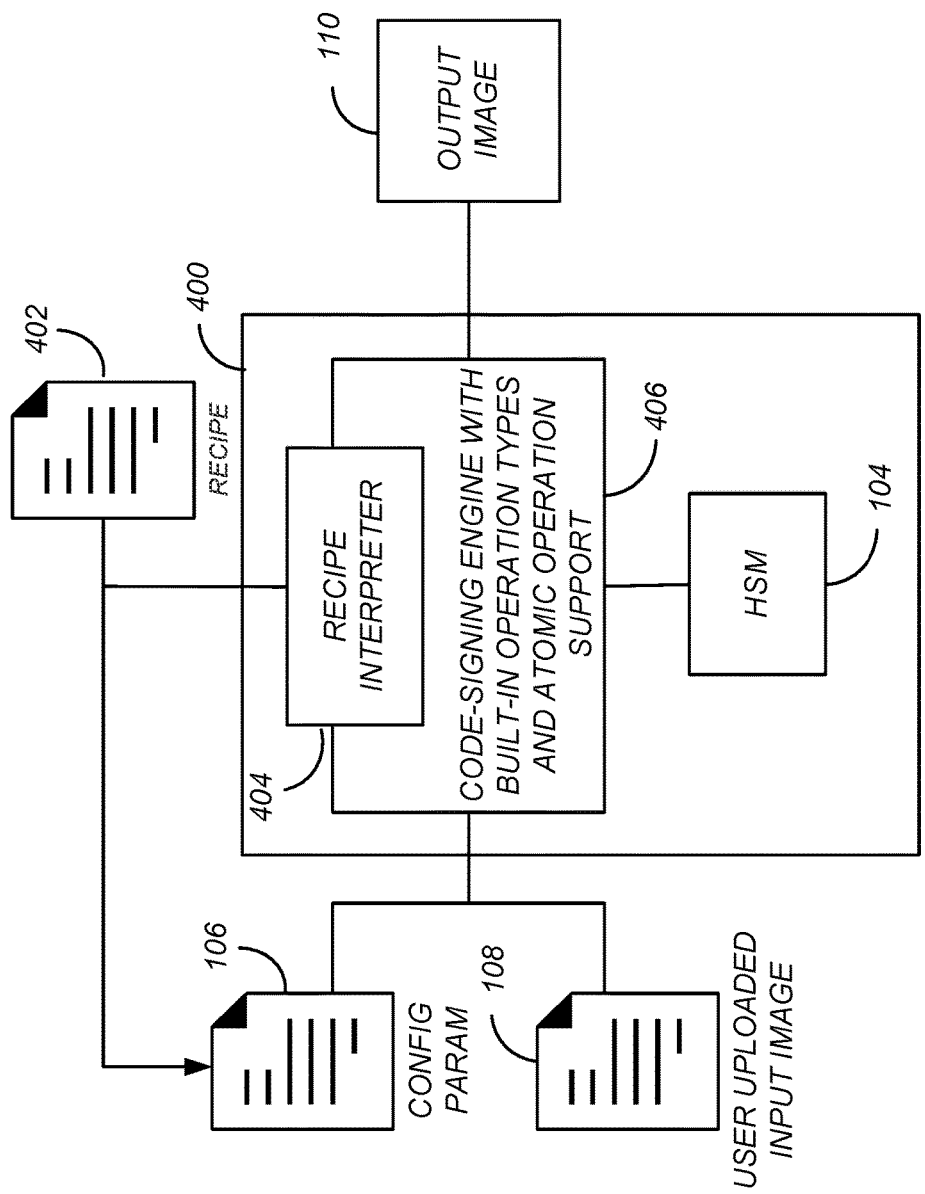
FIG. 4 is a diagram illustrating one embodiment of a configurable code signing system.

FIG. 4 is a diagram illustrating one embodiment of a configurable code signing system (CCSS) 400. In addition to the elements in the code signing system 100 illustrated in FIG. 1, the CCSS 400 includes a recipe interpreter 404 that interprets a recipe 402, and a code signing engine 406 with built-in operation types and atomic operation support. The CCSS 400 can be used in machine-to-machine (M2M) code signing system as well as GUI-based code signing system.

The recipe 402 specifies the detailed operations required to support a certain operation type. This recipe 402 is also defined by the system administrator 302, who basically translates the code signing requirements/specification into a recipe 402 that can be interpreted by recipe interpreter 404 of the code signing engine 406. The code signing engine 406 is modified from the code signing engine 102 of FIG. 1 in that it has support for atomic operations and in one embodiment, also has built in operation types.

The recipe 402 also defines what parameters used in the operation type are configurable, and hence, "configurable parameters." The configurable parameters for the operation type are defined by the system administrator 302, who can also view and edit the configurable parameters.

The code signing engine's recipe-interpreter is capable of parsing and executing the instructions listed in the recipe 402. In addition, the code signing engine 406 supports individual atomic operations that are callable as instructed in the recipe 402. These atomic operations include but not limited to the following:

Byte manipulation—Byte manipulation operations include exclusive or operations (XOR), byte swapping (full reversal, byte-reversal within a word), data extraction (e.g. extracting n bytes of data from input image starting at offset x), and data concatenation.

Cryptographic operations—Cryptographic operations include, for example, signing operations, encryption operations, decryption operations, generation of message digests, code obfuscation operations.

Data field validation—Data filed validation operations include operations to validate that a certain data field has a value matching that of a configuration parameter.

Recipe nesting—Recipes may be nested. This allows support of more complicated code signing based on a modular approach. For example, a boot image may consist of multiple sections, each with a different format. Instead of defining a recipe for the whole boot code, each section can have their own recipe, and the boot code recipe would then combine them. For example, consider recipes R1(•), R2(•) and R3(•). Recipe R3 may be defined as R3=R1(•)*R2(•) or R3(•)=R1(R2(•)).

The recipe interpreter 404 may also support basic logic operation for flow control, such as while loops, for loops, if-then-else statements, switch-case statements commonly found in programming languages and scripting languages.

The high level process of setting up a code signing configuration is as follows:

Step One: If the operation type is new, the system administrator 302 defines the recipe 402 for the operation type based on the code signing requirements. Otherwise, the process proceeds to step two below.

Step Two: The system administrator 302 defines a code signing configuration by first choosing the operation type. based on the recipe of the operation type, the configurable parameters will be displayed. the system administrator 302 then enters values for the configurable parameters.

Step Three: Once the code signing configuration is defined, an authorized user can use it to sign code either via the GUI or the M2M interface.

The Recipe

The recipe 402 defines an operation type and includes at least the following information:
1. The name of the operation type (e.g. XYZ SOC Boot Code Signing Version 1.2).
2. The recipe revision number (i.e. recipe version).
3. A list of configurable (e.g. configuration) parameters (in addition to standard configuration parameters that are applicable to all operation types).
4. The input definition—format and size (fixed or variable) of the input image 108 (to be submitted by the user).
5. A sequence of operations to generate the output file having the output image 110. Each step invokes one or more atomic operations supported by the code signing engine. Atomic operations may be nested.

Configurable Parameters

Based on the recipe 402, an operation type includes a list of configurable parameters, in addition to the standard configurable parameters that are applicable to all operation types. When defining a code signing configuration, the system administrator 302 inputs the values for these parameters into the CCSS 400. A specific example is presented below.

Figure 5:
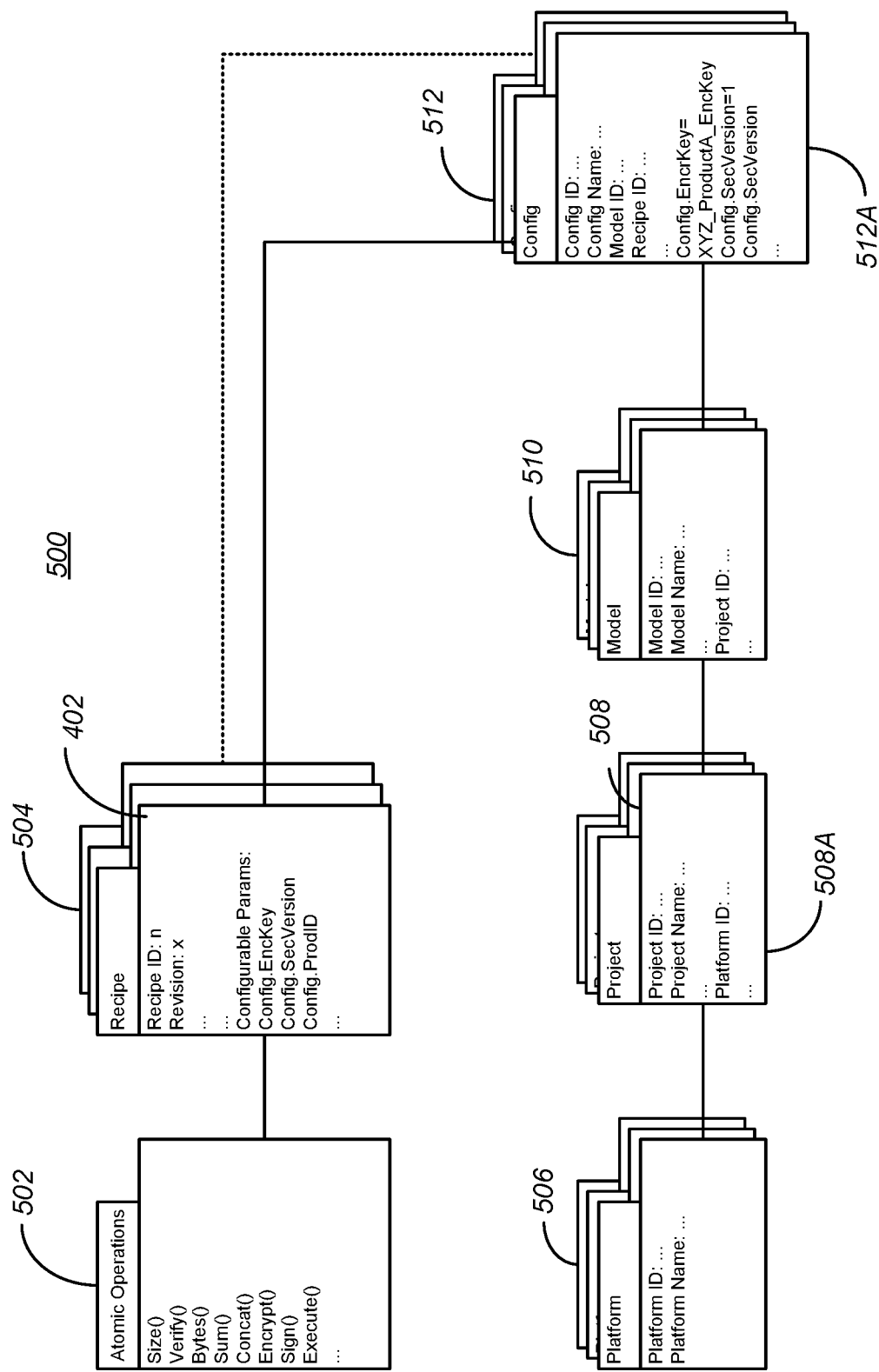
FIG. 5 is a diagram illustrating an exemplary signing configuration organization with collections (such as databases) of the entities maintained by the configurable code signing system.

FIG. 5 is a diagram illustrating an exemplary signing configuration organization 500 with collections (such as databases) of the entities maintained by the CCSS 400, including atomic operations 502, a platform database 506, project database 508, model database 510, configuration database 512 and recipe database 504. Although a four-layer hierarchical structure is illustrated, other such organizations can be implemented.

Each recipe 402 in the recipe database 504 has a Name and identifier (ID). The operations defined in the recipe 402 invoke atomic operations that are defined in the CCSS 400. Also, as explained above, the recipe 402 defines a list of configurable parameters. For example, the recipe 402A shown in FIG. 5 includes three configurable parameters: Config.EncKey, Config.SecVersion, and Config.ProdID. Each configuration definition 512A includes a "Recipe ID" field that determines which recipe 402 of the database 504 of recipes 402 the configuration is tied to. In addition, each the configuration definition 512A defines the values of the configurable parameters. In this example, the configuration definition 512A is derived from recipe 402 with three configurable parameters, and therefore the values of these are defined in the configuration definition 512A.

As an option, there may also be some configuration parameters, values of which are not included in the definition of the configuration. In those cases, the user provides the values of those user-defined parameters every time that new code is submitted to the CCSS. For example, Config.SecVersion value may be left empty, indicating that is will be input by the user, instead of specified in the configuration (which is 1 in our example).

Code Signing Engine

The code signing engine 406 includes a recipe interpreter 404 parses and interprets the recipe 402. The recipe interpreter 404 also provides a set of atomic operations used by the recipe 402. When a new atomic operation is introduced, the code signing engine 406 is updated to support the new atomic operation. In some cases, an existing atomic operation may require some extension to support new parameters or new settings, in which case, the code signing engine 406 is also updated.

Code Signing Process

When a user 308 wants to submit a code image for signing, the user 308 first selects a pre-defined configuration (generated by the system administrator 302) from a list of authorized configurations. The user 308 then submits the code image to be signed according to the selected configuration. The user may also in some cases provide user-defined parameters if their values are not fixed in the configuration. The CCSS 400 reads recipe 402 corresponding to the selected configuration, the values defined in the configuration from its database 512. The CCSS 400 then uses the recipe interpreter 404 to execute the atomic operations over the input image 108 as defined in the recipe 402. During this process, the code signing engine 406 may access the cryptographic keys protected by the HSM 104. For example, the code signing engine 406 may call an HSM API to generate a signature over a blob of data (which may be an intermediate result of executing the recipe 402); or it may call another HSM API to encrypt part of the output image 110. Once the execution is completed, the output image 110 is returned to the user 308.

From the user 308 point of view, there is no difference in user 308 experience as to whether the operation is implemented using the CCSS 400 described here, as to the standard code signing system 100 described in the previous section.

Process

Figure 6:
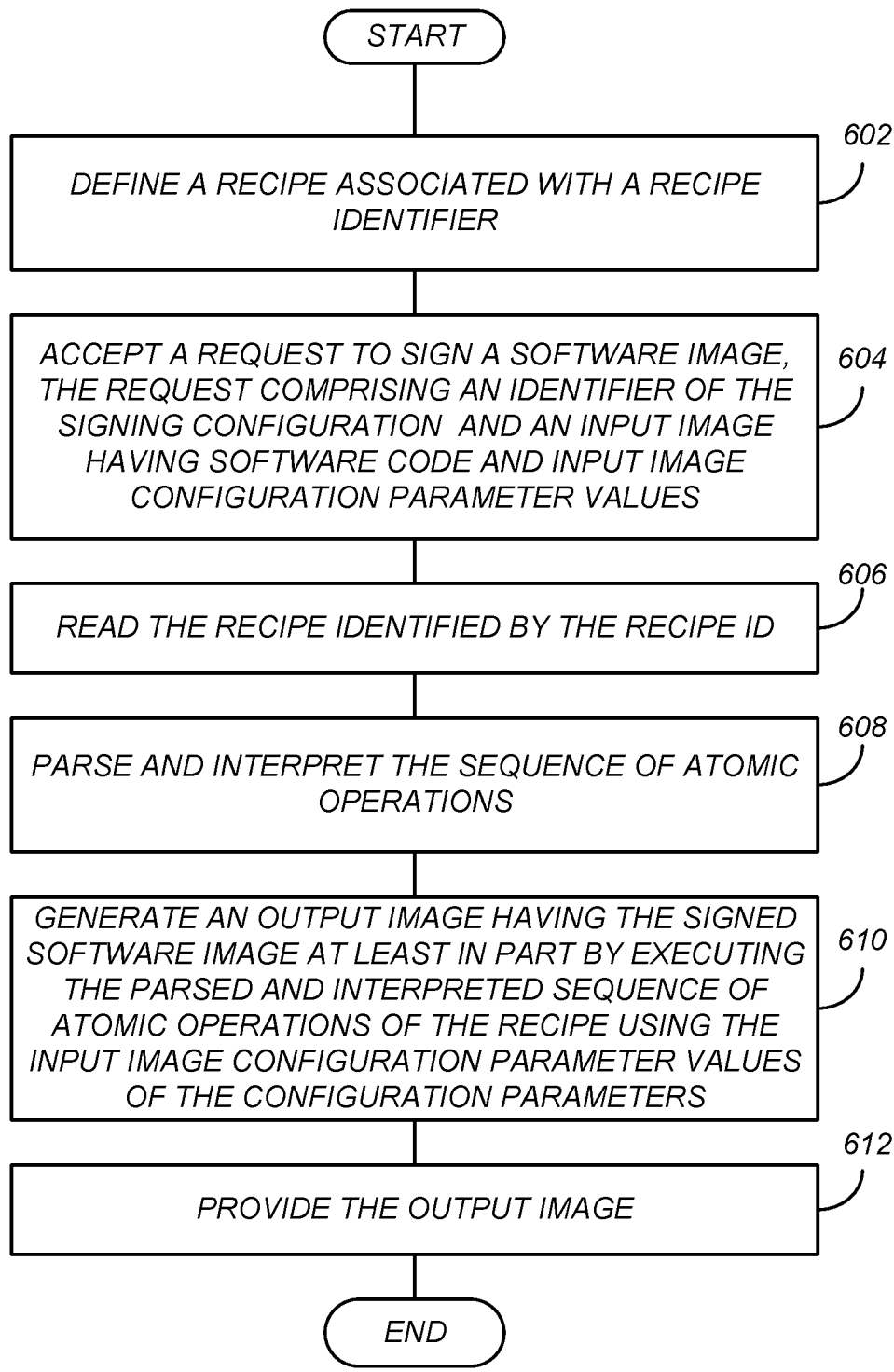
FIG. 6 is a diagram illustrating an exemplary embodiment of operations used to sign an input image.

FIG. 6 is a diagram illustrating an exemplary embodiment of operations used to sign an input image. The operations illustrated in FIG. 6 will be discussed with reference to particular examples further described below.

Basic Example

Referring now to a basic example consider a boot image of a particular SOC (System-On-Chip) needs to be signed and encrypted according to the specification of the SOC vendor.

Table 1 below presents the unsigned/unencrypted boot image generated by a boot image build tool. The unsigned boot image includes some input image configurable parameter values that are used as inputs to the process used to sign the boot image.

In one embodiment, the user 308 submitting the input image 108 for signing cannot arbitrarily change the values of some or all of the configurable parameters in the input image 108. Instead, the configurable parameters of the input image 108 are validated by the CCSS 400 against the values for the configurable parameters that are approved by the system administrator 302 when setting up the signing configuration. In other words, for a particular SOC, the signing configuration defined by the system administrator 302 includes approved configuration parameter values that are compared to the input image configuration parameters to confirm that they match. If they do not match, the boot image rejected and not signed.

In the example below, these configuration parameters include the magic value, the security version, the product ID, the encryption algorithm, and the signing algorithm. The recipe 402 discussed below checks to determine if the configuration values in the input boot image 108 match those of the signing configuration. For example, if the value for the encryption algorithm in the input image 108 is 0 and the approved value for the encryption algorithm in the input image is 1, the input boot image 108 will be rejected and not signed to produce the output image 110.

TABLE 1

Example Input Image

| Data Field | Type | Description |
|---|---|---|
| Magic Value | Binary (4 bytes) | 0xAABBCCDD, fixed value |
| Security Version | Binary (4 bytes) | Security version of the image. Configurable. |
| Product ID | Binary (4 bytes) | Product ID of the image. Configurable. |
| Encryption Algorithm | Binary (2 bytes) | 0 = AES-ECB<br>1 = AES-CBC<br>Configurable. |
| Signing Algorithm | Binary (2 bytes) | 0 = SHA1-RSA<br>1 = SHA256-RSA<br>Configurable. |
| Code Size | Binary (4 bytes) | Variable |
| Code | Binary (variable length) | Clear Code section of the image. |
| Data Size | Binary (4 bytes) | Variable |
| Data | Binary (variable length) | Clear Data section of the image. |

In this example, the input image 108 also includes a maximum input image size, which may be different for different products. For example, the maximum input image size may be 1 MB for one product, and 2 MB for another product.

Table 2 describes one embodiment of a desired output image 110 corresponding to the input image 108 of Table 1.

TABLE 2

Example Desired Output Image

| Data Field | Type | Description |
|---|---|---|
| Magic Value | Binary (4 bytes) | 0xAABBCCDD, fixed value |
| Security Version | Binary (4 bytes) | Security version of the image. Configurable. |
| Product ID | Binary (4 bytes) | Product ID of the image. Configurable |

TABLE 2-continued

Example Desired Output Image

| Data Field | Type | Description |
|---|---|---|
| Encryption Algorithm | Binary (2 bytes) | 0 = AES-ECB<br>1 = AES-CBC |
| Signing Algorithm | Binary (2 bytes) | 0 = SHA1-RSA<br>1 = SHA256-RSA |
| Code Size | Binary (4 bytes) | Variable |
| Code | Binary (variable length) | Encrypted Code section of the image |
| Data Size | Binary (4 bytes) | Variable |
| Data | Binary (variable length) | Encrypted Data section of the image |
| Signature | Binary (256 bytes) | RSA signature over encrypted data from start up to but not including the Signature field itself. |

Although the desired output image has a structure similar to the input image, this is not required. In this example, the signing configuration is such that the CCSS 400 is required to perform the following steps to sign the boot image:

1. Verify that the input image (e.g. as illustrated in Table 1) is smaller than the maximum allowable size.
2. Verify the "magic value" of the input image.
3. Verify the security version of the input image against the associated value of the security version defined in the configuration.
4. Verify the production identifier (ID) against the value of the production ID defined in the configuration.
5. Verify the encryption algorithm against the value of the encryption algorithm defined in the configuration.
6. Verify the signing algorithm against the value of the signing algorithm defined in the configuration.
7. Locate the code section based on the value of the "Code Size" configurable parameter of Table 1 and encrypt using the encryption key and the encryption algorithm defined in the configuration (e.g. the values of the Encryption Key and Encryption Algorithm parameters in Table 1).
8. Locate the data section based on the "Data Size" configurable parameter of Table 1, and encrypt it using the encryption key and the encryption algorithm defined in the configuration (e.g. the values of the Encryption Key and Encryption Algorithm parameters in Table 1).
9. Generate the to-be-signed image. The to-be signed image is as shown in Table 2 (without the Signature field)
10. Generate the signature over the to-be-signed image using the Signing Key and the Signing Algorithm defined in the configuration.
11. Concatenate the to-be-signed image and the signature to form the output image as shown in Table 2.

These operations are performed at least in part by the code signing engine 406 of FIG. 4 using the recipe 402 identified by the configuration definition 512A defined by the system administrator 302 as interpreted by recipe interpreter 404 operating on data disposed in the uploaded input image 108 and input image configuration parameters and/or user-defined parameters.

Referring now to FIG. 6, in block 602, the system administrator 302 defines a recipe 402 from the foregoing software image signing requirements (as defined in steps 1-11). The recipe 402 is associated with a recipe identifier specified in the configuration definition 512A.

The recipe 402 comprises a name of an operation type associated with the recipe 402, a sequence of atomic operations for generating the signed software image, and a list of configuration parameters used by the sequence of atomic operations of the recipe 402.

Table 3 is an exemplary defined recipe 402 for performing steps 1-11 illustrated above. The sequence of atomic operations performed to sign the input image 108 according to the signing configuration is presented in Table 4. In this example, the name of the operation type associated with the recipe 402 is "XYZ SOC Boot Code Version 1.2," the list of configuration parameters used by the sequence of atomic operations of the recipe 402 are configuration parameters 1-7, and the sequence of atomic operations are as shown in Table 4. The list of configuration parameters used by the sequence of atomic operations of the recipe 402 associates those configuration parameters with operands used by the atomic operations.

For example, the configuration parameter list includes the Encryption Key Label (associated with the operand of the atomic operations as Config.EncKey), for a Signing Key Label, (associated with the operand of the atomic operations as Config.SigKey), for a Security Version, (associated with the operand of the atomic operations as Config.SecVer), for a Product ID, (associated with the operand of the atomic operations as Config.ProdID), for a Encryption Algorithm, associated with the operand of the atomic operations as Config.EncAlg), for a Signing Algorithm, (associated with the operand of the atomic operations as Config.SigAlg), and for a maximum allowable Input Image size (associated with the operand of the atomic operations as Config.MaxSize). The input image shown in Table 1 has values for configuration parameters Encryption Key Label, Signing Key Label, Security Version, Product ID, Encryption Algorithm, Signing Algorithm, and the Maximum Allowable Input Image size, which the associates with Config.EncKey, Config.SigKey, Config.SecVer, Config.ProdID, Config.EncAlg, and Config.SigAlg, respectively.

The recipe 402 also includes a revision number and an input definition, which defines the size of the input image 108 to be operated on by the recipe 402. The recipe 402 also comprises and a sequence of atomic operations.

TABLE 3

Example Recipe

| Field | Value |
|---|---|
| Name of Operation Type | XYZ SOC Boot Code Version 1.2 |
| Revision | 1 |
| List of Configurable Parameters | 1. Config.EncKey - Encryption Key Label<br>2. Config.SigKey - Signing Key Label<br>3. Config.SecVer - Security Version<br>4. Config.ProdID - Product ID<br>5. Config.EncAlg - Encryption Algorithm<br>6. Config.SigAlg - Signing Algorithm<br>7. Config.MaxSize - Maximum allowable Input Image size. |
| Input Definition | Variable length binary data smaller than the Maximum allowable size |
| Sequence of Operations | See Table 4 below. |

Table 4 presents list of operations for the exemplary recipe 402 presented in Table 3 to perform steps 1-11. Atomic operations are highlighted ALL CAPS. Note also that atomic operations may be nested within each step.

TABLE 4

List of Operations for the Example Recipe

| Step | Atomic Operations | Description |
|---|---|---|
| 1. | IF(SIZE(Input Image) > Config.MaxSize) THEN Stop and Return Error | Verify that the input image is smaller than the allowable size. |
| 2. | VERIFY(BYTES(Input Image, 0, 4), 0xAABBCCDD) | Verify that the first 4 bytes of the Input image is as specified. |
| 3. | VERIFY(BYTES(Input Image, 4, 4), Config.SecVersion) | Verify that the 4 bytes starting at offset 4 matches the Security Version specified in the Configuration. |
| 4. | VERIFY(BYTES(Input Image, 8, 4), Config.ProdID) | Verify that the 4 bytes starting at offset 8 matches the Product ID specified in the Configuration. |
| 5. | VERIFY(BYTES(Input Image, 12, 2), Config.EncAlg) | Verify that the 2 bytes starting at offset 12 matches the Encryption Algorithm specified in the Configuration. |
| 6. | VERIFY(BYTES(Input Image, 14, 2), Config.SigAlg) | Verify that the 2 bytes starting at offset 14 matches the Signing Algorithm specified in the Configuration. |
| 7. | Var.CodeSize = BYTES(Input Image, 16, 4) | Set an intermediate data field "CodeSize" based on the value in the Input Image. This is not necessary but will simplifies subsequent step. |
| 8. | Var.EncCode = ENCRYPT(BYTES(input Image, 20, Var.CodeSize), Config.EncAlg, Config.EncKey) | Encrypt the "Code" portion of the Input image using the Encryption Key and Algorithm specified in the Configuration. Save the result to an intermediate data field EncCode. |
| 9. | Var.DataSizeOffset = SUM(20, Var.CodeSize) | Set an intermediate data field "DataLengthOffset". |
| 10. | Var.DataSize = BYTES(Input Image, Var.DataSizeOffset, 4) | Set an intermediate data field "DataSize" based on the value in the Input Image. This is not necessary but will simplify the subsequent step. |
| 11. | Var.EncData = ENCRYPT(BYTES(Input Image, SUM(Var.DataSizeOffset, 4), Var.DataSize) | Encrypt the "Data" portion of the Input image using the Encryption Key and Algorithm specified in the Configuration. Save the result to an intermediate data field EncData. |
| 12. | Var.TBSImage = CONCAT(BYTES(Input Image, 0, 20), Var.EncCode, Var.DataSize, Var.EncData) | Generate the To-be-signed image. |
| 13. | Var.Sig = SIGN(Var.TBSImage, Config.SigAlg, Config.SigKey) | Generate the signature over the To-be-signed image. |
| 14. | Output = CONCAT(Var.TBSImage, Var.Sig) | Generate output image. |

Example atomic operations used in the foregoing list of operations are described as below:
1. SIZE(A): Return the size of A.
2. VERIFY(A, B): Verify that A and B are the same.
3. BYTES(A, Start, NumBytes): Get NumBytes bytes from data field A at offset Start.
4. SUM(A, B, . . . ): Compute the sum of the input numbers.
5. CONCAT(A, B, . . . ): Concatenate the data A, B, etc.
6. ENCRYPT(A, Alg, Key): Cryptographically encrypt the data field A using Algorithm Alg and key.
7. SIGN(A, Alg, Key): Cryptographically sign the data field A using Algorithm Alg and key.

Other possible atomic operations include:
1. Byte manipulation atomic operations such as:
   a. OR(A, B, . . . ): Compute the logical OR of the input numbers.
   b. XOR(A, B, . . . ): Compute the logical XOR of the input numbers.
   c. AND(A, B, . . . ): Compute the logical AND of the input numbers.
   d. NOT(A): Compute the logical inverse of the input number.
2. Other cryptographic atomic operations (in addition to the ENCRYPT and SIGN atomic operations), such as:
   a. HASH(A, f), which cryptographically hashes data filed A using hash function f.
3. Other arithmetic atomic operations (in addition to the SUM atomic operation) such as:
   a. DIFF(A, B, . . . ): Compute the difference of the input numbers.
   b. MULT(A, B, . . . ): Compute the multiplication of the input numbers.
   c. DIV(A, B, . . . ): Compute the result of A/B of the input numbers.

Figure 7:
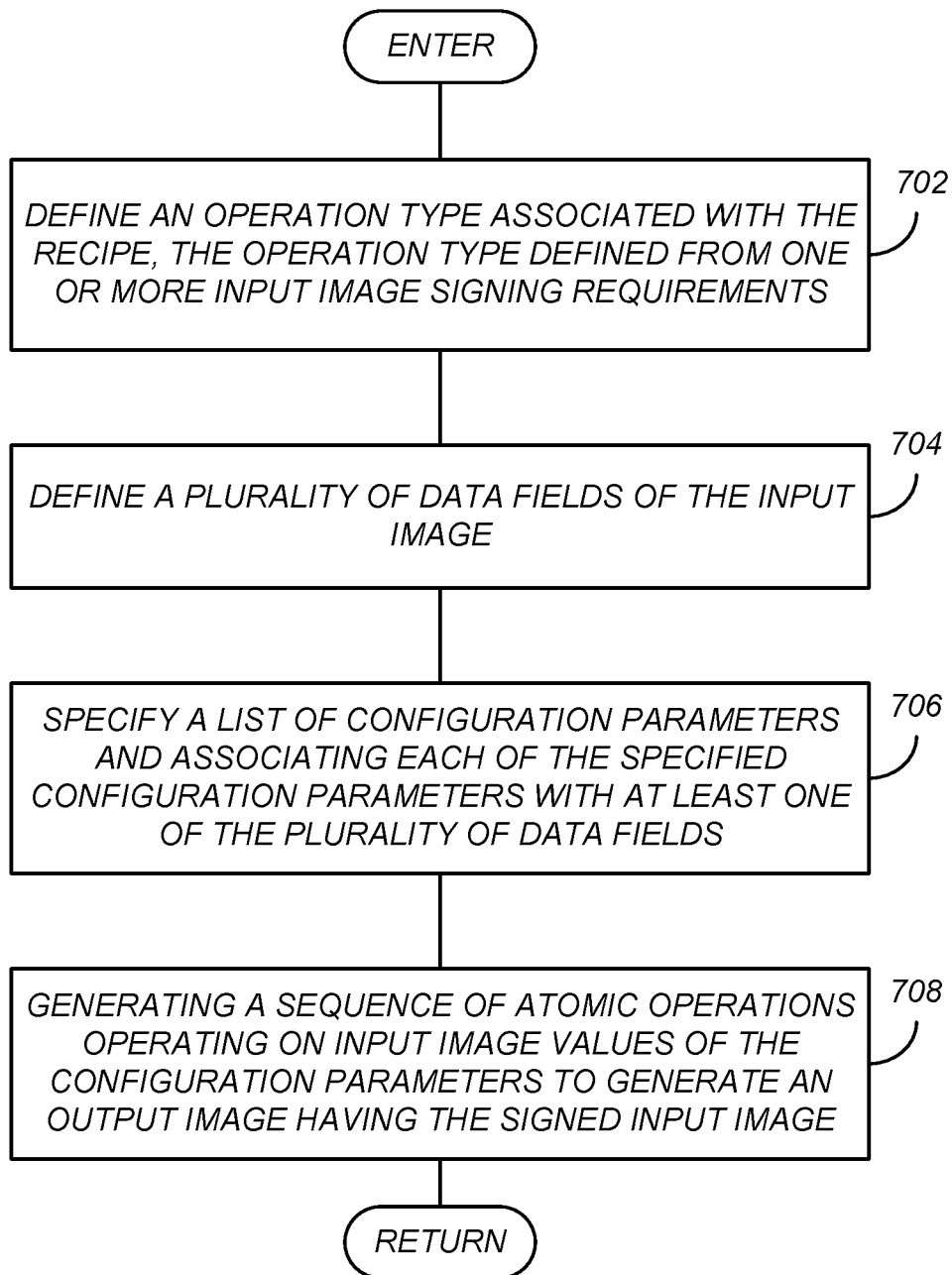
FIG. 7 is a diagram illustrating an exemplary process for generating a recipe.

FIG. 7 is a diagram illustrating an exemplary process for generating the recipe. This process can be completed with a recipe generation tool, as described further below. In block 702, the system administrator 302 defines an operation type associated with the recipe 402, the operation type defined from one or more input image 108 signing requirements (such as those illustrated in steps 1-11 above). The system administrator 302 also defines a plurality of data fields of the input image 108, as shown in block 704. An example of such data fields is presented in Table 1. The system administrator 302 then specifies a list of configuration parameters and associates each of the specified configuration parameters with at least one of the plurality of data fields, as shown in block 706. An exemplary list of configurable parameters is show in Table 3, and each of those configurable parameters is associated with at least one of the data fields of Table 1. In block 708, a sequence of atomic operations that operate on input image values of the configuration parameters to generate an output file having the output image is generated. Table 4 provides a list of atomic operations that operate on the input values (e.g. those in the third column of Table 1) to generate the output image of Table 2.

As described above, the sequence of operations includes a byte (BYTES(A, Start, NumBytes)) atomic operation that references at least one of the plurality of data fields and an offset within the one of the plurality of data fields. The byte atomic operation retrieves data of the input file at the indicated offset (NumBytes of data field A at the offset "Start"). Also, the sequence of operations includes a signing atomic operation (SIGN) that signs the input image at least in part according to the input image values of the configuration parameters. In the example shown above, the sign operation signs the information in data field A using a particular algorithm and key specified in the configuration parameters.

Step 6 of Table 4 above, specifies a VERIFY operation be performed to compare value of the Signing Algorithm (the bytes of the input image, starting 14 bytes into the input image and including the next two bytes, with the value specified in the configuration (Config.SigAlg) to determine if they match. If they do not match, the VERIFY atomic operation suspends the signing operations.

Step 2 of Table 4 above specifies the use of the VERIFY operation to compare the magic value of the input image (disposed in the first 4 bytes as defined by the system administrator 302) match the approved magic value defined in the configuration definition 512A by the system administrator 302.

Referring again to FIG. 6, a request to sign a software image is accepted in the CCSS 400, as shown in block 604. The request includes the input image 108 (e.g. as described in Table 1) and an identifier of the signing configuration.

The input image 108 comprises software code and data (e.g. the "code" and "data" entries of Table 1), an input image configuration values (including, for example, the "security version," "product ID," "encryption algorithm," and "signing algorithm" entries of Table 1). The identified signing configuration includes the recipe ID and approved configuration parameter values that must match the input image configuration parameter values.

Referring again to FIG. 6, block 606 reads the recipe identified by the recipe ID, the recipe is then parsed and interpreted by recipe interpreter 404, as shown in block 608. Then, as shown in block 610, an output image having the signed software image is generated at least in part by executing the parsed an interpreted sequence of atomic operations of the recipe using the input image configuration values defined in the input image of the configuration parameters defined in the recipe. In block 612, the output image is provided.

Multiple Signing Configurations

Based the recipe 402, different configurations can be defined for different products that make use of the same SOC. For example, a product ProductA with Product ID "0x0000000A" may have the configuration shown in Table 5:

TABLE 5

Configuration for ProductA

| Configurable Parameter | Type | Value |
|---|---|---|
| Config.EncKey | ASCII (Key Label) | XYZ_ProductA_EncKey |
| Config.SigKey | ASCII (Key Label) | XYZ_ProductA_SigKey |
| Config.SecVer | Binary (4 bytes) | 0x00000001 |
| Config.ProdID | Binary (4 bytes) | 0x0000000A |
| Config.EncAlg | Binary (2 bytes) 0 = AES-ECB 1 = AES-CBC | 0x0000 for AES-ECB |
| Config.SigAlg | Binary (2 bytes) 0 = SHA1-RSA 1 = SHA256-RSA | 0x0000 for SHA1-RSA |
| Config.MaxSize | Integer (4 bytes) | 1,048,576 (for 1 MB) |

A different product (e.g. ProductB) may have different configurations as shown in Table 6 below. Note that all the fields happen to have different values than ProductA.

TABLE 6

Configuration for ProductB

| Configurable Parameter | Type | Value |
|---|---|---|
| Config.EncKey | ASCII (Key Label) | XYZ_ProductB_EncKey |
| Config.SigKey | ASCII (Key Label) | XYZ_ProductB_SigKey |
| Config.SecVer | Binary (4 bytes) | 0x00000004 |
| Config.ProdID | Binary (4 bytes) | 0x0000000B |
| Config.EncAlg | Binary (2 bytes) 0 = AES-ECB 1 = AES-CBC | 0x0001 for AES-CBC |
| Config.SigAlg | Binary (2 bytes) 0 = SHA1-RSA 1 = SHA256-RSA | 0x0001 for SHA256-RSA |
| Config.MaxSize | Integer (4 bytes) | 2,097,152 (for 2 MB) |

Looping and Nesting of Recipes

As described above, recipes 402 can be nested. In a second example presented below, the use of switch-statement and a nested recipe 402 is illustrated. As shown in Table 7, the input image has a header field "Code Format" that determines the format of the output image.

TABLE 7

Input Image

| Data Field | Type | Description |
|---|---|---|
| Code Format | Binary (4 bytes) | 0: Format A 1: Format B 2: Format C |
| Code | Binary (512 KBs) | Code to be signed. |

Now, consider the desired output image shown in Table 8 below:

TABLE 7

Desired Output Image

| Data Field | Type | Description |
|---|---|---|
| Code Format | Binary (4 bytes) | 0: Format A 1: Format B 2: Format C |

TABLE 7-continued

Desired Output Image

| Data Field | Type | Description |
| --- | --- | --- |
| Code | Binary (512 KBs) | Code to be signed |
| Signature | Binary (256 bytes) | Signature over the above fields. |

Assume that the following recipes have been defined:
Recipe A: Convert an Input Image to "Format A"
Recipe B: Convert an Input Image to "Format B"
Recipe C: Convert an Input Image to "Format C"

Table 8 presents a list of atomic operations for the example recipe 402. Note that all atomic operations are highlighted in ALL CAPS. Note also that atomic operations may be nested within each step.

TABLE 8

| Step | Operations | Description |
| --- | --- | --- |
| 1. | SWITCH(Bytes(Input Image, 0, 4)): Case 0: Var.TBSImage = EXECUTE(Recipe A, Input Image) Case 1: Var.TBSImage = EXECUTE(Recipe B, Input Image) Case 2: Var.TBSImage = EXECUTE(Recipe C, Input Image) | Based on the "Code Format" value, determine which sub recipe to execute in order to format the input Image accordingly. |
| 2. | Var.Sig = SIGN(Var.TBSImage, Config.SigAlg, Config.SigKey) | Generate the signature over the To-be-signed image. |
| 3. | Output = CONCAT(Var.TBSImage, Var.Sig) | Generate output image. |

This example uses additional the additional "EXECUTE" atomic operation EXECUTE(R, A): Execute Recipe "R" on data A.

The foregoing examples present an exemplary embodiment using a particular syntax for atomic operations and recipes for illustrative purposes. Actual implementations may employ different syntaxes and atomic operations.

Hardware Environment

Figure 8:
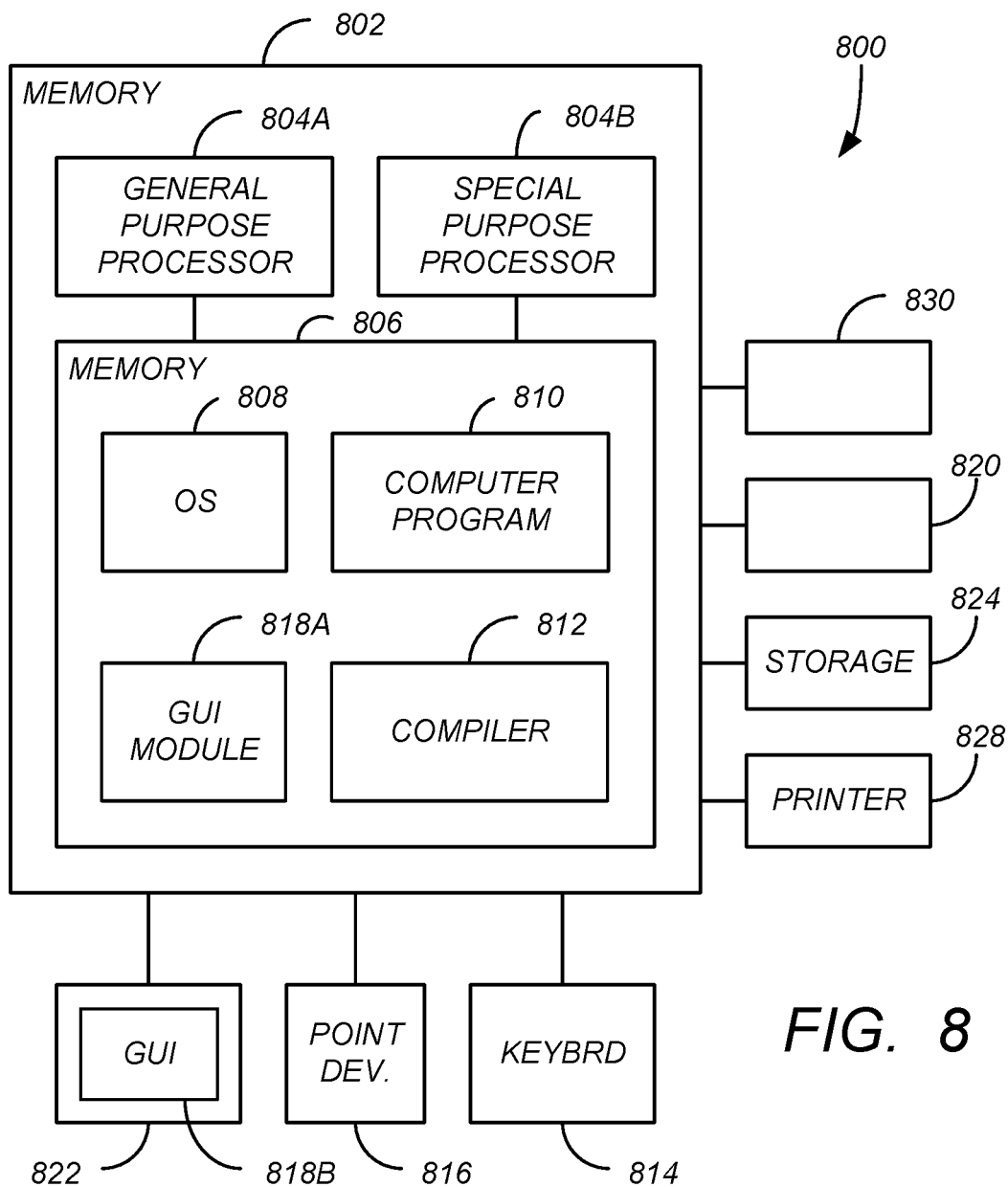
FIG. 8 illustrates an exemplary computer system that could be used to implement processing elements of the geolocation system.

FIG. 8 illustrates an exemplary computer system 800 that could be used to implement processing elements of the above disclosure, including the CCSS 400, the recipe definition and validation tool, and the equipment used by the user 308 to submit input files and retrieve output images 110. The computer 802 comprises a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer 828, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of generating a signed input image in a configurable code signing system, comprising:
   defining a recipe associated with a recipe identifier, comprising:
      defining an operation type associated with the recipe, the operation type defined from one or more input image signing requirements;
      defining a plurality of data fields of the input image;
      specifying a list of configuration parameters and associating each of the specified configuration parameters with at least one of the plurality of the data fields;
      specifying a sequence of atomic operations operating on input image values of the configuration parameters to generate an output image having the signed input image;
         wherein the sequence of atomic operations includes:
            a byte atomic operation referencing at least one of the plurality of data fields and an offset within the one of the plurality of data fields wherein the byte atomic operation retrieves data of the input image at the offset;
a cryptographic operation including a signing atomic operation for signing the input image at least in part according to the input image values of the configuration parameters;
accepting, in the configurable code signing system, a request to sign the input image, the request comprising:
the input image, comprising:
the plurality of data fields; and
software code and input image values of the configuration parameters disposed within the plurality of data fields;
an identifier of a signing configuration, the signing configuration including:
the recipe identifier; and
approved configuration parameter values;
reading the recipe identified by the recipe identifier;
parsing and interpreting the sequence of atomic operations of the recipe;
generating the output image having the signed input image at least in part by executing the parsed and interpreted sequence of atomic operations of the recipe using the input image values of the configuration parameters; and
providing the output image.

2. The method of claim 1, wherein the output image is generated at least in part by executing the parsed and interpreted sequence of atomic operations of the recipe using values of standard configuration parameters, the standard configuration parameters being applicable to another operation type.

3. The method of claim 1, wherein:
the input image further comprises a magic value; and
the sequence of operations generates the output image only if the input image configuration parameter values match the approved configuration parameter values.

4. The method of claim 1, wherein the sequence of operations generates the output image only if the input image configuration parameter values match the approved configuration parameter values.

5. The method of claim 1, wherein:
the sequence of atomic operations further comprises:
a further atomic operation selected from a group of atomic operations comprising:
a first atomic operation for returning a size of first data;
a data field validation atomic operation for validating that third data and fourth data are equal;
a concatenation atomic operation for concatenating fifth data and sixth data;
an arithmetic atomic operation for computing an arithmetic result of at least one of seventh data and eighth data, including at least one of a sum operation, a difference operation, a multiplication operation, and a division operation;
a byte manipulation atomic operation for manipulating binary data, including at least one of a logical OR operation, a logical exclusive OR operation, a logical AND operation and a logical inverse operation; and
an execute atomic operation for executing another recipe on tenth data; and
a further cryptographic operation including at least one of an encryption operation and a hashing operation.

6. The method of claim 1, wherein:
the recipe comprises a reference to a second recipe, the second recipe having a second sequence of atomic operations, the second sequence of operations used to further generate the output image; and
generating the output image having the signed input image at least in part by executing the parsed and interpreted sequence of atomic operations of the recipe using the input image values of the configuration parameters comprises:
executing, from the reference to the second recipe, the parsed and interpreted second sequence of operations to generate a result used in executing the parsed and interpreted sequence of atomic operations.

7. The method of claim 1, wherein
the parsing and interpreting of the sequence of atomic operations is performed by a recipe interpreter; and
the output image is generated by a code signing engine supporting execution of the interpreted sequence of atomic operations.

8. An apparatus for generating a signed input image in a configurable code signing system, comprising:
a processor;
a memory, communicatively coupled to the processor, the memory storing processor instructions comprising processor instructions for
defining a recipe associated with a recipe identifier, comprising:
defining an operation type associated with the recipe, the operation type defined from one or more input image signing requirements;
defining a plurality of data fields of the input image;
specifying a list of configuration parameters and associating each of the specified configuration parameters with at least one of the plurality of the data fields;
specifying a sequence of atomic operations operating on input image values of the configuration parameters to generate an output image having the signed input image;
wherein the sequence of atomic operations includes:
a byte atomic operation referencing at least one of the plurality of data fields and an offset within the one of the plurality of data fields wherein the byte atomic operation retrieves data of the input image at the offset;
a signing atomic operation for signing the input image at least in part according to the input image values of the configuration parameters;
accepting, in the configurable code signing system, a request to sign the input image, the request comprising:
the input image, comprising:
the plurality of data fields; and
software code and input image values of the configuration parameters disposed within the plurality of data fields;
an identifier of a signing configuration, the signing configuration including:
the recipe identifier; and
approved configuration parameter values;
reading the recipe identified by the recipe identifier;
parsing and interpreting the sequence of atomic operations of the recipe;
generating the output image having the signed input image at least in part by executing the parsed and interpreted sequence of atomic operations of the recipe using the input image values of the configuration parameters; and providing the output image.

9. The apparatus of claim 8, wherein the output image is generated at least in part by executing the parsed and interpreted sequence of atomic operations of the recipe using values of standard configuration parameters, the standard configuration parameters being applicable to another operation type.

10. The apparatus of claim 8, wherein:
the input image further comprises a magic value; and
the sequence of operations generates the output image only if the input image configuration parameter values match the approved configuration parameter values.

11. The apparatus of claim 8, wherein the sequence of operations generates the output image only if the input image configuration parameter values match the approved configuration parameter values.

12. The apparatus of claim 8, wherein:
the sequence of atomic operations further comprises:
  a further atomic operation selected from a group of atomic operations comprising:
    a first atomic operation for returning a size of first data;
    a data field validation atomic operation for validating that third data and fourth data are equal;
    a concatenation atomic operation for concatenating fifth data and sixth data;
    an arithmetic atomic operation for computing an arithmetic result of at least one of seventh data and eighth data, including at least one of a sum operation, a difference operation, a multiplication operation, and a division operation;
    a byte manipulation atomic operation for manipulating binary data, including at least one of a logical OR operation, a logical exclusive OR operation, a logical AND operation and a logical inverse operation; and
    an execute atomic operation for executing another recipe on tenth data; and
  a further cryptographic operation including at least one of an encryption operation and a hashing operation.

13. The apparatus of claim 8, wherein:
the recipe comprises a reference to a second recipe, the second recipe having a second sequence of atomic operations, the second sequence of operations used to further generate the output image; and
generating the output image having the signed input image at least in part by executing the parsed and interpreted sequence of atomic operations of the recipe using the input image values of the configuration parameters comprises:
  executing, from the reference to the second recipe, the parsed and interpreted second sequence of operations to generate a result used in executing the parsed and interpreted sequence of atomic operations.

14. The apparatus of claim 8, wherein
the parsing and interpreting of the sequence of atomic operations is performed by a recipe interpreter; and
the output image is generated by a code signing engine supporting execution of the interpreted sequence of atomic operations.

15. An apparatus for generating a signed input image in a configurable code signing system, comprising:
means for defining a recipe associated with a recipe identifier, comprising:
  means for defining an operation type associated with the recipe, the operation type defined from one or more input image signing requirements;
  means for defining a plurality of data fields of the input image;
  means for specifying a list of configuration parameters and associating each of the specified configuration parameters with at least one of the plurality of the data fields;
  means for specifying a sequence of atomic operations operating on input image values of the configuration parameters to generate an output image having the signed input image;
    wherein the sequence of atomic operations includes:
      a byte atomic operation referencing at least one of the plurality of data fields and an offset within the one of the plurality of data fields wherein the byte atomic operation retrieves data of the input image at the offset;
      a signing atomic operation for signing the input image at least in part according to the input image values of the configuration parameters;
means for accepting, in the configurable code signing system, a request to sign the input image, the request comprising:
  the input image, comprising:
    the plurality of data fields; and
    software code and input image values of the configuration parameters disposed within the plurality of data fields;
  an identifier of a signing configuration, the signing configuration including:
    the recipe identifier; and
    approved configuration parameter values;
means for reading the recipe identified by the recipe identifier;
means for parsing and interpreting the sequence of atomic operations of the recipe;
means for generating the output image having the signed input image at least in part by executing the parsed and interpreted sequence of atomic operations of the recipe using the input image values of the configuration parameters; and
means for providing the output image.

16. The apparatus of claim 15, wherein the output image is generated at least in part by executing the parsed and interpreted sequence of atomic operations of the recipe using values of standard configuration parameters, the standard configuration parameters being applicable to another operation type.

17. The apparatus of claim 15, wherein:
the input image further comprises a magic value; and
the sequence of operations generates the output image only if the input image configuration parameter values match the approved configuration parameter values.

18. The apparatus of claim 15, wherein the sequence of operations generates the output image only if the input image configuration parameter values match the approved configuration parameter values.

19. The apparatus of claim 15, wherein:
the sequence of atomic operations further comprises:
  a further atomic operation selected from a group of atomic operations comprising:
    a first atomic operation for returning a size of first data;
    a data field validation atomic operation for validating that third data and fourth data are equal;

a concatenation atomic operation for concatenating fifth data and sixth data;

an arithmetic atomic operation for computing an arithmetic result of at least one of seventh data and eighth data, including at least one of a sum operation, a difference operation, a multiplication operation, and a division operation;

a byte manipulation atomic operation for manipulating binary data, including at least one of a logical OR operation, a logical exclusive OR operation, a logical AND operation and a logical inverse operation; and an execute atomic operation for executing another recipe on tenth data; and a further cryptographic operation including at least one of an encryption operation and a hashing operation.

20. The apparatus of claim 15, wherein:

the recipe comprises a reference to a second recipe, the second recipe having a second sequence of atomic operations, the second sequence of operations used to further generate the output image; and generating the output image having the signed input image at least in part by executing the parsed and interpreted sequence of atomic operations of the recipe using the input image values of the configuration parameters comprises:

executing, from the reference to the second recipe, the parsed and interpreted second sequence of operations to generate a result used in executing the parsed and interpreted sequence of atomic operations.

\* \* \* \* \*